US010504512B1

(12) United States Patent
Sarikaya et al.

(10) Patent No.: US 10,504,512 B1
(45) Date of Patent: Dec. 10, 2019

(54) NATURAL LANGUAGE SPEECH PROCESSING APPLICATION SELECTION

(71) Applicant: Amazon Technologies, Inc., Seattle, WA (US)

(72) Inventors: Ruhi Sarikaya, Redmond, WA (US); Rohit Prasad, Lexington, MA (US); Kerry Hammil, Seattle, WA (US); Spyridon Matsoukas, Hopkinton, MA (US); Nikko Strom, Kirkland, WA (US); Frédéric Johan Georges Deramat, Seattle, WA (US); Stephen Frederick Potter, Seattle, WA (US); Young-Bum Kim, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 141 days.

(21) Appl. No.: 15/712,625

(22) Filed: Sep. 22, 2017

(51) Int. Cl.
*G06F 17/20* (2006.01)
*G10L 15/22* (2006.01)
*G10L 15/08* (2006.01)
*G10L 15/26* (2006.01)
*G06F 17/27* (2006.01)

(52) U.S. Cl.
CPC .......... *G10L 15/22* (2013.01); *G06F 17/278* (2013.01); *G10L 15/08* (2013.01); *G10L 15/265* (2013.01)

(58) Field of Classification Search
CPC ........ G06F 17/20; G06F 17/21; G06F 17/218; G06F 17/22; G06F 17/2229; G06F 17/2241; G06F 17/2247; G06F 17/242; G06F 17/27; G06F 17/2705; G06F 17/271; G06F 17/2715; G06F 17/2725; G06F 17/274; G06F 17/2785; G06F 17/279; G06F 17/2795; G06F 17/2881
USPC ................................. 704/9, 1, 3, 5, 10, 270
See application file for complete search history.

(56) References Cited

U.S. PATENT DOCUMENTS

| 2015/0286747 | A1* | 10/2015 | Anastasakos | ....... G06F 16/9017 707/776 |
| 2016/0026621 | A1* | 1/2016 | Misra | ................... G06F 17/2785 704/9 |
| 2016/0048655 | A1* | 2/2016 | Maitra | ................. G06F 19/3456 705/3 |
| 2017/0068551 | A1* | 3/2017 | Vadodaria | ......... H04M 1/72522 |
| 2018/0365219 | A1* | 12/2018 | Ezen Can | ............. G06F 17/277 |

* cited by examiner

*Primary Examiner* — Qi Han
(74) *Attorney, Agent, or Firm* — Pierce Atwood LLP

(57) ABSTRACT

Techniques for limiting natural language processing performed on input data are described. A system receives input data from a device. The input data corresponds to a command to be executed by the system. The system determines applications likely configured to execute the command. The system performs named entity recognition and intent classification with respect to only the applications likely configured to execute the command.

20 Claims, 8 Drawing Sheets

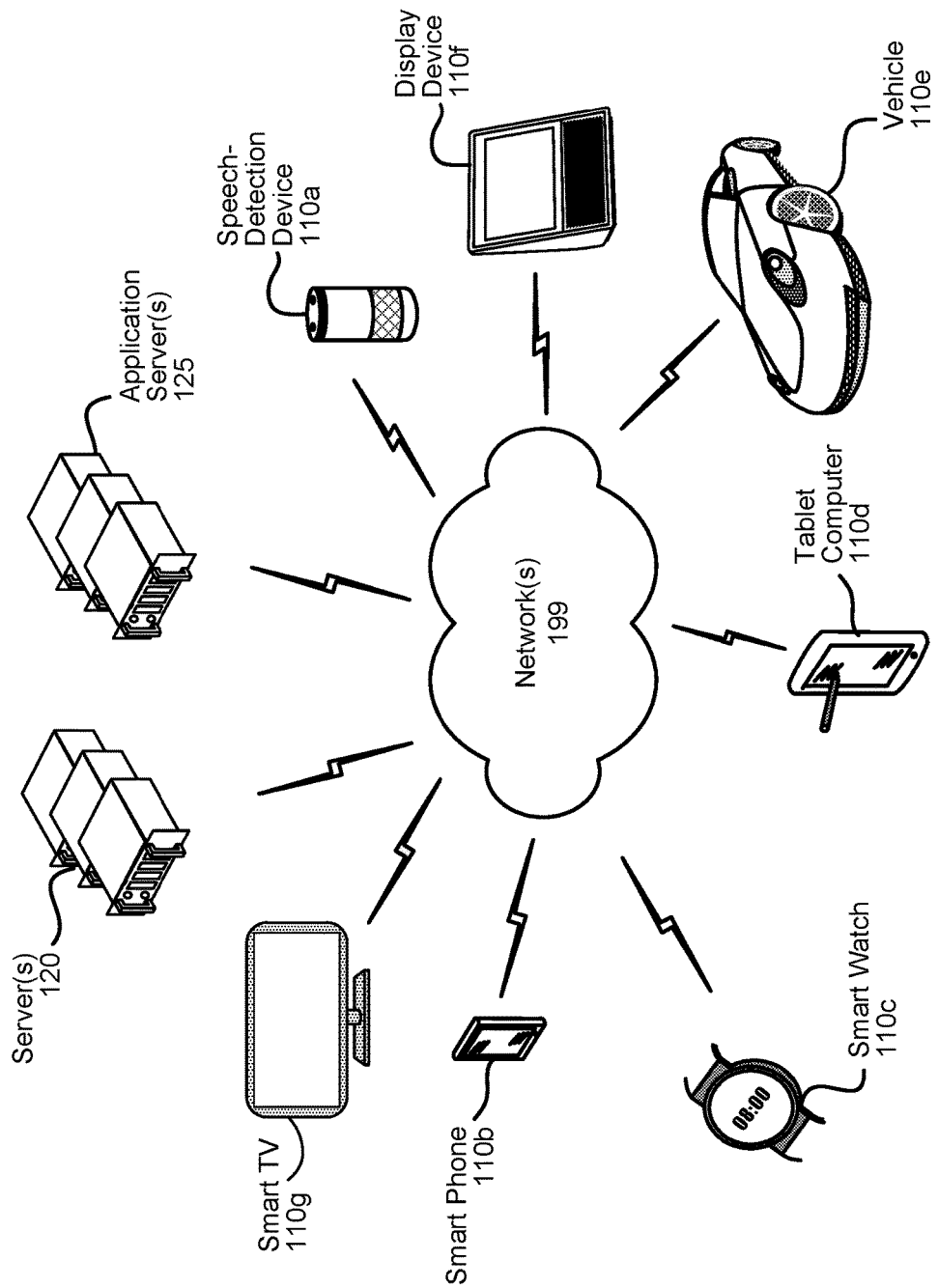

NATURAL LANGUAGE SPEECH PROCESSING APPLICATION SELECTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 8 illustrates an example of a computer network for use with the speech processing system.

DETAILED DESCRIPTION

Figure 1:
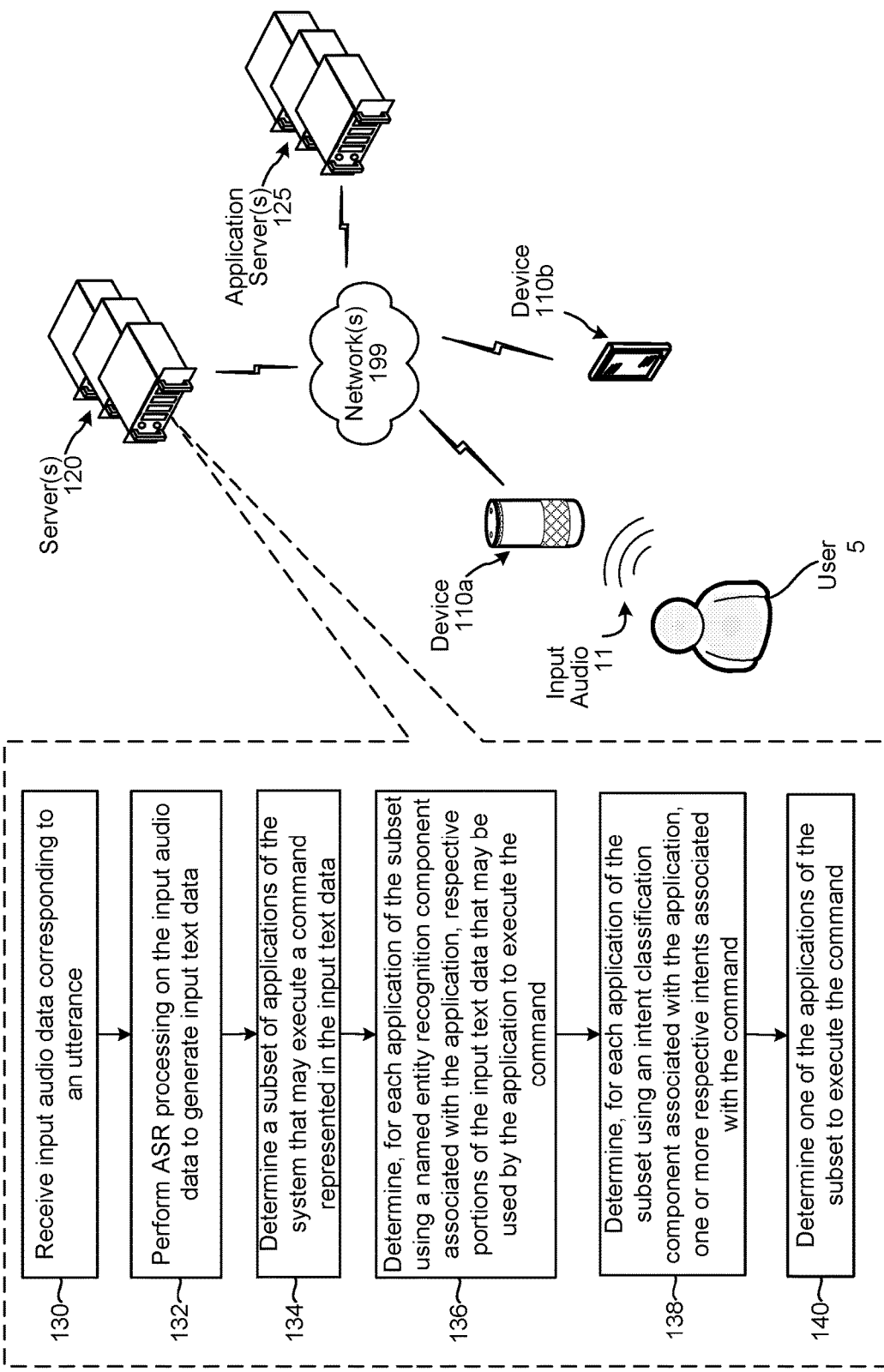
FIG. 1 illustrates a system configured to perform speech processing according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. For example, a user may say "Alexa, what is the weather?" In response, the system may output weather information. For further example, a user may say "Alexa, play Adele." In response, the system may output Adele music.

The system may be configured with multiple applications (e.g., thousands of applications) that can be used to potentially respond to a user command. For example, the system may include weather applications, music applications, video applications, calendar applications, timer applications, general knowledge answering applications, game applications, etc. Further, the system may be capable of operating many different applications that have an overlapping subject matter. For example, the system may include more than one application that can execute commands related to requests for weather information. For further example, the system may include one or more medical information applications that execute commands requesting medical information. Determining which application should be selected to handle an incoming user command is a non-trivial problem.

The system may determine, in parallel, which of the entirety of the system's applications may execute a given command. For example, when the system receives a command, the system may determine, for each application, the portions of the command that may be relevant to the application's execution of the command as well as one or more intents related to the particular application to which the command potentially relates. Performing such operations (called named entity recognition and intent classification, as explained below) for many different applications operable by a system can consume significant computing resources as well as potentially lead to increased latency from when the user speaks a command to when execution of the command actually occurs.

The system may require a command be spoken in a certain format to invoke a certain application. The system (or an application) may require the command be structured as "[Keyword], ask [application] to [payload]." Examples include "Alexa, ask Ride Genie to book me a ride to the library," "Alexa, ask the Weather Channel what is the weather for tomorrow," etc. While such structures may ease system processing in selecting a particular application, they may also limit user freedom with regard to selecting a particular application.

The present disclosure improves speech controlled computing systems by reducing the cognitive burden on a user to remember the exact structure required to invoke a specific application. That is, the present disclosure enables a user to invoke specific applications using natural language speech. The present disclosure also allows for a reduction in the amount of computing resources needed to consider a large number of potential applications for each incoming command.

A system according to the present disclosure creates a list that includes only a subset of the applications of the system to which a command likely relates. That list is created prior to determining the portions of the command that may be relevant to an application's execution of the command as well as prior to determining a potential intent to which the command relates. The system may implement one or more trained models that enable the system to determine a portion/subset of the system's applications to which a command likely relates. Then the system can perform additional natural language processing (such as named-entity recognition, intent classification, etc.) only with regard to the applications that are included in the list. The present disclosure thus enables a system to narrow down the applications that it performs "heavy" natural language processes on.

FIG. 1 illustrates a system for performing speech processing with respect to an input utterance. Although the figures and discussion illustrate certain operational steps of the system in a particular order, the steps described may be performed in a different order (as well as certain steps removed or added) without departing from the intent of the disclosure. Devices (110a/110b) local to a user 5, one or more server(s) 120, and one or more application servers 125 may communicate across one or more networks 199.

The device 110a receives input audio 11 corresponding to a spoken utterance of the user 5. The device 110a generates input audio data corresponding to the input audio 11 and sends the input audio data to the server(s) 120.

The server(s) 120 receives (130) the input audio data from the device 110a. The server(s) 120 performs (132) automatic speech recognition (ASR) processing on the input audio data to generate input text data.

The server(s) 120 then performs natural language understanding (NLU) processing on input text data. As described above, the input text data may be generated by performing ASR processing on input audio data. Alternatively, the input text data may be generated from input text or other input data. For example, a device 110b may receive user input corresponding to text via a touch screen providing a virtual keyboard. The device 110b may generate input text data corresponding to the input text. The device 110b may send the input text data to the server(s) 120 via a companion application operating on the device 110b and in communication with the server(s) 120.

The server(s) 120 determines (134) a subset of the applications of the system that may execute a command represented in the input text data. The server(s) 120 thereafter uses the subset of the applications to determine potential NLU results. For example, the server(s) 120 may thereafter determine (136), for each application of the subset and using a named entity recognition component associated with the application, respective portions of the input text data that may be used by the application to execute the command. The server(s) 120 also determines (138), for each application of the subset using an intent classification component associated with the application, one or more respective intents associated with the command. An intent may correspond to an action to be performed by the system in response to the command.

The server(s) 120 determines (140) one of the applications of the subset to execute the command. The application may be a first party (1P) application (e.g., one controlled and/or maintained by the server(s) 120). The application may alternatively be a third party (3P) application (e.g., one not controlled and/or maintained by the server(s) 120, but in communication with the server(s) 120, such as one operated by an application server(s) 125).

The server(s) 120 receives output data responsive to the command from the application. The server(s) 120 sends the output data to the device 110. The device 110 outputs content corresponding to the output data to the user 5.

Figure 2:
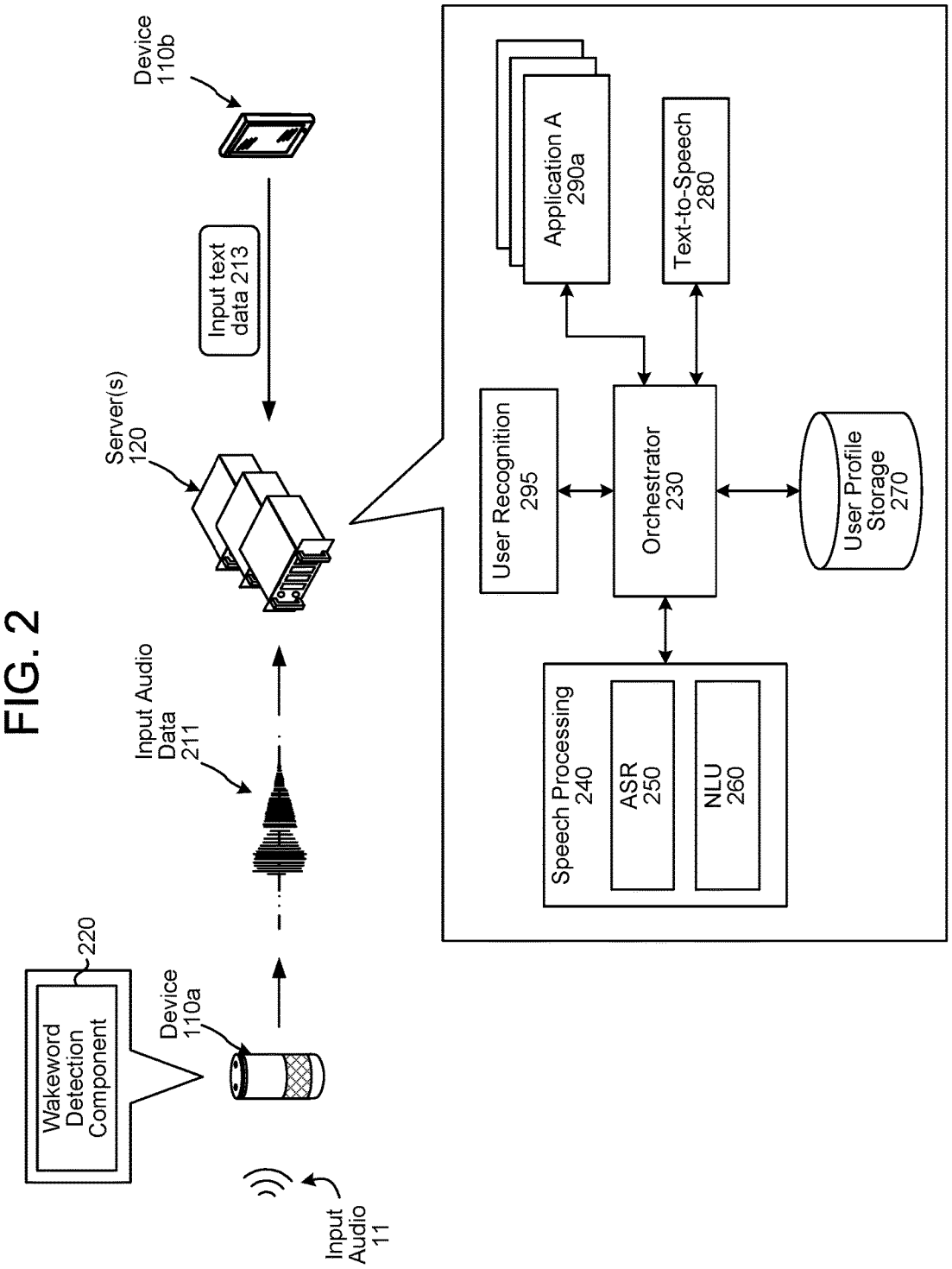
FIG. 2 is a conceptual diagram of components of a system according to embodiments of the present disclosure.

The system may operate using various components as described in FIG. 2. The various components may be located on a same or different physical devices. Communication between various components may occur directly or across a network(s) 199.

The device 110a may receive input audio 11, corresponding to a spoken utterance corresponding at least in part to a command, using an audio capture component, such as a microphone or array of microphones. The device 110a, using a wakeword detection component 220, processes audio data corresponding to the input audio 11 to determine if a keyword (e.g., a wakeword) is detected in the audio data. Following detection of a wakeword, the device 110a sends input audio data 211, corresponding to the utterance, to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the spoken utterance in the input audio data 211 based on a similarity between the spoken utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends the input text data generated thereby to an NLU component 260 of the speech processing component 260. The input text data sent from the ASR component 250 to the NLU component 260 may include a top scoring hypothesis or may include an N-best list including a group of hypotheses and potentially their respective scores.

Alternatively, the device 110b may send input text data 213 to the server(s) 120. Upon receipt by the server(s) 120, the input text data 213 may be sent to the orchestrator component 230. The orchestrator component 230 may send the input text data 213 to the NLU component 260.

The NLU component 260 attempts to make a semantic interpretation of the phrases or statements represented in the input text data input therein. That is, the NLU component 260 determines one or more meanings associated with the phrases or statements represented in the input text data based on individual words represented in the input text data. The NLU component 260 interprets text to derive an intent of a command represented in the input text data (e.g., an action that a user desires be performed) as well as pertinent pieces of information in the input text data that allow a device (e.g., the device 110a, the device 110b, the server(s) 120, the application server(s) 125, etc.) to complete the intent. For example, if the input text data corresponds to "call mom," the NLU component 260 may determine a user intended to activate a telephone in his/her device and to initiate a call with a contact matching the entity "mom."

The server(s) 120 may include a user recognition component 295. The user recognition component 295 may take as input the input audio data 211 and/or input text data output by the ASR component 250. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing speech characteristics in the input audio data 211 to stored speech characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU component processes as well as processing performed by applications 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a respective unique user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

The orchestrator component 230 may send data output from the NLU component 260 (e.g., text data including tags attributing meaning to the words and phrases represented in the text data), and optionally output from the user recognition component 295 and/or data from the user profile storage 270, to one or more applications 290. FIG. 2 illustrates various IP applications 290 executed by the server(s) 120. However, it should be appreciated that the orchestrator component 230 may additionally or alternatively send data output from the NLU component 260 to one or more application servers 125 executing 3P applications that may thereby cause the application server(s) 125 to provide the server(s) 120 with content responsive to the command.

An "application," as used herein, may be considered synonymous with a "skill." A skill may be software running on an application server(s) 125 that enables the application server(s) 125 to implement certain functionality to provide data or produce some other output requested by a user. The system may be configured with more than one skill. For example, a weather skill may enable an application server(s) 125 to provide the server(s) 120 with weather information, a car service skill may enable an application server(s) 125 to book a taxi or ride sharing ride and provide the server(s) 120 with information representing same, an order pizza skill may enable an application server(s) 125 to place a pizza order and provide the server(s) 120 with information representing same, etc.

The system may also be configured with different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

An application server(s) 125 implementing a skill may provide the server(s) 120 with data indicating one or more intents that represent actions that the skill can perform for users. For example, a weather skill may be associated with a <GetWeather> intent that enables the weather skill to provide weather information, a car service skill may be associated with a <BookRide> intent that enables the car service skill to book a taxi or ride sharing ride, an order pizza skill may be associated with a <OrderPizza> intent that enables the order pizza skill to place a pizza order via an API of a pizzeria's system, etc. An application server(s) 125 implementing a skill may also provide the server(s) 120 with data indicating sample utterance that specify word and phrases users can say to invoke the skill's intent(s).

The orchestrator component 230 may choose which application 290 to invoke based on the data output by the NLU component 260. In an example, the orchestrator component 230 may invoke a music playing application when the NLU component 260 outputs text data associated with a command to play music. In another example, the orchestrator component 230 may invoke a weather application when the NLU component 260 outputs text data associated with a command to output weather information. In yet another example, the orchestrator component 230 may invoke a search engine application when the NLU component 260 outputs text data associated with a command to obtain search results.

An application 290 may output text data, which the orchestrator component 230 may send to a text-to-speech component 280. The text-to-speech component 280 may synthesize speech corresponding to the text data input thereto. The server(s) 120 (e.g., the orchestrator 230) may send output audio data synthesized by the text-to-speech component 280 to the device (110*a*/110*b*) (or another device including a speaker and associated with the same user ID or customer ID) for output to the user.

The text-to-speech component 280 may perform speech synthesis using one or more different methods. In one method of synthesis called unit selection, the text-to-speech component 280 matches text data against a database of recorded speech. The text-to-speech component 280 selects matching units of recorded speech matching the text data and concatenates the units together to form output audio data. In another method of synthesis called parametric synthesis, the text-to-speech component 280 varies parameters such as frequency, volume, and noise to create output audio data including an artificial speech waveform. Parametric synthesis uses a computerized voice generator, sometimes called a vocoder.

Figure 3:
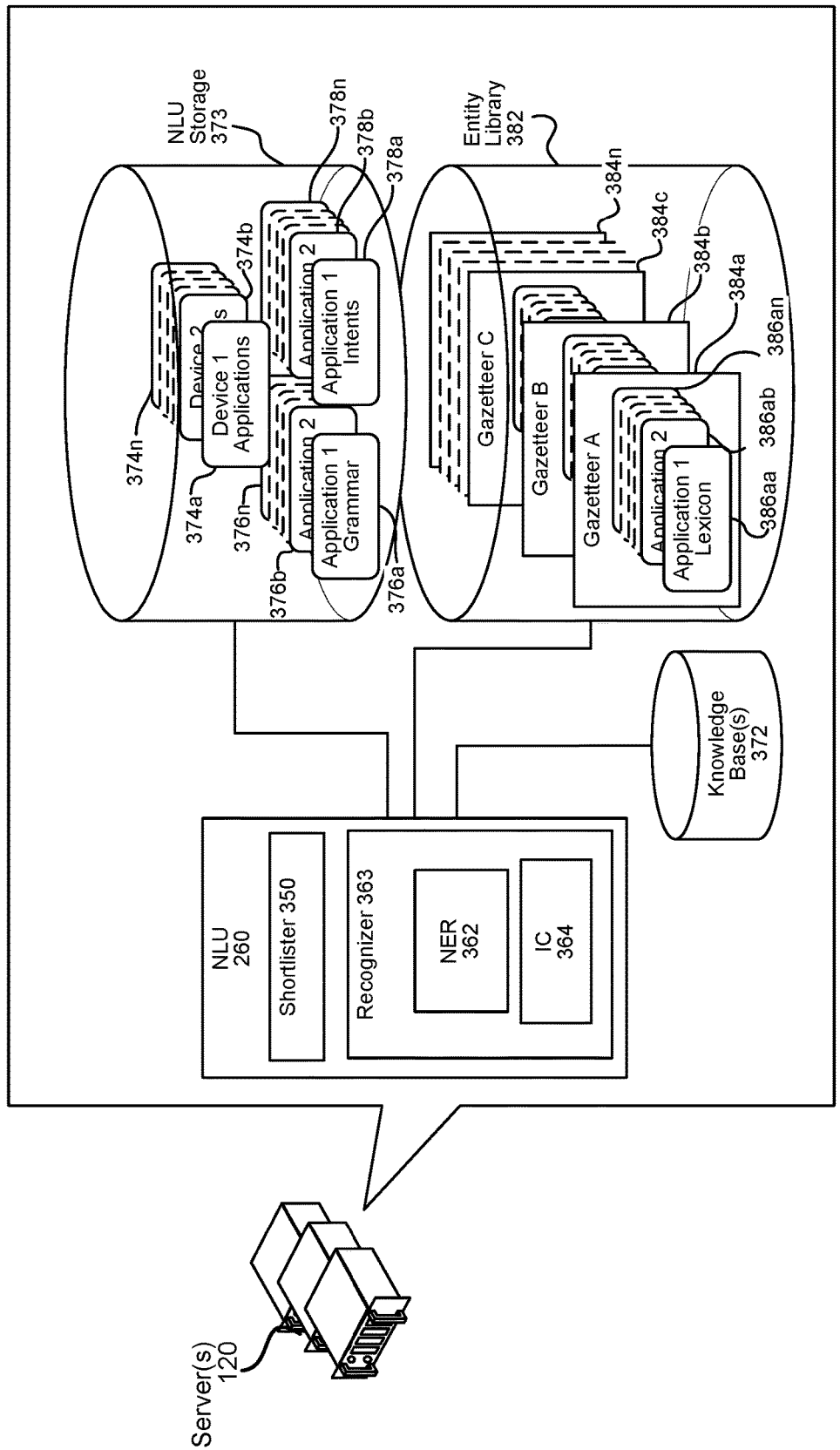
FIG. 3 is a conceptual diagram of how natural language processing is performed according to embodiments of the present disclosure.

FIG. 3 illustrates how NLU processing is performed on input text data. Generally, the NLU component 360 attempts to make a semantic interpretation of text represented in text data input thereto. That is, the NLU component 360 determines the meaning behind text represented in text data based on the individual words. The NLU component 360 interprets text to derive an intent or a desired action from the user as well as the pertinent pieces of information in the text that allow a device (e.g., the device 110*a*, the device 110*b*, the server(s) 120, the application server(s) 125) to complete that action. For example, if the NLU component 260 receives text data including text corresponding to "tell me the weather," the NLU component 260 may determine that the user the system to output weather information.

The NLU component 260 may process text data including several hypotheses of a single utterance. For example, if the ASR component 250 outputs text data including an N-best list of hypotheses, the NLU component 260 may process the text data with respect to all (or a portion of) the hypotheses represented therein.

The NLU e component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 350. The shortlister component 350 selects applications that may execute with respect to text data 410 input to the NLU component (e.g., applications that may execute the command). The shortlister component 350 thus limits downstream, more resource intensive NLU processes to being performed with respect to applications that may execute the command.

Without a shortlister component 350, the NLU component 260 may process a given hypothesis with respect to every application of the system, either in parallel, in series, or using some combination thereof. By implementing a shortlister component 350, the NLU component 260 may process a given hypothesis with respect to only the applications that may execute the command. This reduces total compute power and latency attributed to NLU processing.

The shortlister component 350 may include one or more trained models. The model(s) may be trained to recognize various forms of utterances that may be received by the system. For example, during a training period an application server(s) 125 associated with an application may provide the system with training text data representing sample utterances that may be provided by a user to invoke the application. For example, for a ride sharing application, an application server(s) 125 associated with the ride sharing application may provide the system with training text data including text corresponding to "get me a cab to [location]," "get me a ride to [location]," "book me a cab to [location]," "book me a ride to [location]," etc. The one or more trained models that will be used by the shortlister component 350 may be trained, using the training text data representing sample utterances, to determine other potentially related utterance structures that a user may try to use to invoke the particular application. During training, the system may solicit the application server(s) 125 associated with the application regarding whether the determined other utterance structures are permissible, from the perspective of the application server(s) 125, to be used to invoke the application. The alternate utterance structures may be derived by one or more trained models during model training and/or may be based on utterance structures provided by different applications. The application server(s) 125 associated with a particular application may also provide the system with training text data indicating grammar and annotations. The system may use the training text data representing the sample utterances, the determined related utterance, the grammar, and the annotations to train a model that indicates when an input command is likely to be directed to/handled by an application, based at least in part on the utterance structure of an input command. Each trained model of the shortlister component 350 may be trained with respect to a different application. Alternatively, the shortlister component 350 may use one trained model per application type, such as one trained model for weather applications, one trained model for ride sharing applications, or the like.

The system may use the sample utterances provided by an application server(s) 125, and related sample utterances potentially determined during training, as binary examples to train a model associated with an application associated with the application server(s) 125. The model associated with the particular application may then be operated at runtime by the shortlister component 350. For example, some sample utterances may be positive examples (e.g., utterances that may be used to invoke the application). Other sample utterance may be negative examples (e.g., utterances that may not be used to invoke the application).

As described above, the shortlister component 350 may include a different trained model for each application of the system, a different trained model for each application category, or some other combination of trained model(s). For example, the shortlister component 350 may alternatively include a single model. The single model may include a portion trained with respect to characteristics (e.g., semantic characteristics) shared by all applications of the system. The single model may also include application specific portions, with each application specific portion being trained with respect to a specific application of the system. Implementing a single model with application specific portions may result in less latency than implementing a different trained model for each application because the single model with application specific portions limits the number of characteristics processed on a per skill level.

The portion trained with respect to characteristics shared by more than one application may be clustered based on application type. For example, a first portion of the portion trained with respect to multiple applications may be trained with respect to weather applications, a second portion of the portion trained with respect to multiple application may be trained with respect to music applications, a third portion of the portion trained with respect to multiple applications may be trained with respect to travel applications, etc.

Clustering may be not beneficial in every instance because it may cause the shortlister component 350 to output indications of only a portion of the applications that the input command may belong to. For example, an input command may correspond to "tell me about Tom Collins." If the model is clustered based on application type, the shortlister component 350 may determine the command corresponds to a recipe application (e.g., a drink recipe) even though the command may also correspond to an information application (e.g., including information about a person named Tom Collins).

Training the shortlister component 350 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. Each recognizer 363 may be associated with a different application 290.

If the shortlister component 350 determines text corresponding to a hypothesis is potentially associated with multiple applications 290, the recognizers 363 associated with the applications 290 (e.g., the recognizers 363 associated with the applications in the subset selected by the shortlister 350) may process the text. The selected recognizers 363 may process the text in parallel, in series, partially in parallel, etc. For example, if text corresponding to a hypothesis potentially implicates both a communications application and a music application, a recognizer associated with the communications application may process the text in parallel, or partially in parallel, with a recognizer associated with the music application processing the text. The output generated by each recognizer 363 may be scored, with the overall highest scored output from all recognizers 363 ordinarily being selected to be the correct result.

The NLU component 260 may communicate with various storages to determine the potential application(s) associated with a hypothesis. The NLU component 260 may communicate with an NLU storage 373, which includes a databases of devices (374a-374n) identifying applications associated with specific devices. For example, the device 110 may be associated with applications for music, calendaring, contact lists, device-specific communications, etc. In addition, the NLU component 260 may communicate with an entity library 382, which includes database entries about specific services on a specific device, either indexed by Device ID, Speaker ID, or Household ID, or some other indicator.

Each recognizer 363 may include a named entity recognition (NER) component 362. The NER component 362 attempts to identify grammars and lexical information that may be used to construe meaning with respect to text represented in text data input therein. The NER component 362 identifies portions of text represented in text data input into the NLU component 260 that correspond to a named entity that may be recognizable by the system. The NER component 362 (or other component of the NLU component 260) may also determine whether a word refers to an entity that is not explicitly mentioned in the text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include application-indexed lexical information associated with a particular user and/or device. For example, the Gazetteer A (384a) includes application-index lexical information 386aa to 386an. A user's music application lexical information might include album titles, artist names, and song names, for example, whereas a user's contact list application lexical information might include the names of contacts. Since every user's music collection and contact list is presumably different, this personalized information improves entity resolution.

An NER component 362 applies grammar models 376 and lexical information 386 associated with the application (associated with the recognizer 363 implementing the NER component 362) to determine a mention one or more entities in text data input therein. In this manner, the NER component 362 identifies "slots" (i.e., particular words in text data) that may be needed for later command processing. The NER component 362 may also label each slot with a type (e.g., noun, place, city, artist name, song name, etc.).

Each grammar model 376 includes the names of entities (i.e., nouns) commonly found in speech about the particular application (i.e., generic terms) to which the grammar model 376 relates, whereas the lexical information 386 is personalized to the user(s) and/or the device from which the input audio data 211 or input text data 213 originated. For example, a grammar model 376 associated with a shopping application may include a database of words commonly used when people discuss shopping.

A downstream process called named entity resolution actually links a portion of text data to an actual specific entity known to the system. To perform named entity resolution, the NLU component 260 may utilize gazetteer information (384a-384n) stored in an entity library storage 382. The gazetteer information 384 may be used to match text represented in text data output by the ASR component 250 with different entities, such as song titles, contact names, etc. Gazetteers may be linked to users (e.g., a particular gazetteer may be associated with a specific user's music collection), may be linked to certain applications (e.g., a shopping application, a music application, a video application, a communications application, etc.), or may be organized in a variety of other ways.

Each recognizer 363 may also include an intent classification (IC) component 364. The IC component 364 parses text data input thereto to determine an intent(s) of the application associated with the recognizer 363 that potentially corresponds to the command represented in the text data. An intent corresponds to an action to be performed that is responsive to the command represented by the text data. The IC component 364 may communicate with a database 378 of words linked to intents. For example, a music intent database may link words and phrases such as "quiet," "volume off," and "mute" to a "mute" intent. The IC component 364 identifies potential intents by comparing words and phrases in input text data to the words and phrases in an intents database 378 associated with the application that is associated with the recognizer 363 implementing the IC component 364.

The intents identifiable by a specific IC component 364 are linked to application-specific (i.e., the application associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the application associated with the recognizer 363 implementing the NER component 362, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music application recognizer 363 may parse and tag text data including text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music application, which an IC component 364 (also implemented by the music application recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the hypothesis represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the application (in the knowledge base 372). For example, if the text data includes text corresponding to "play songs by the rolling stones," after failing to determine an album name or song name called "songs" by "the rolling stones," the NER component 362 may search the application vocabulary for the word "songs." In the alternative, generic words may be checked before the gazetteer information, or both may be tried, potentially producing two different results.

The NLU component 260 may tag text of a hypothesis represented in text data to attribute meaning to the hypothesis. For example, the NLU component 260 may tag "play mother's little helper by the rolling stones" as: {application} Music, {intent} Play Music, {artist name} rolling stones, {media type} SONG, and {song title} mother's little helper. For further example, the NLU component 260 may tag "play songs by the rolling stones" as: {application} Music, {intent} Play Music, {artist name} rolling stones, and {media type} SONG.

Figure 4:
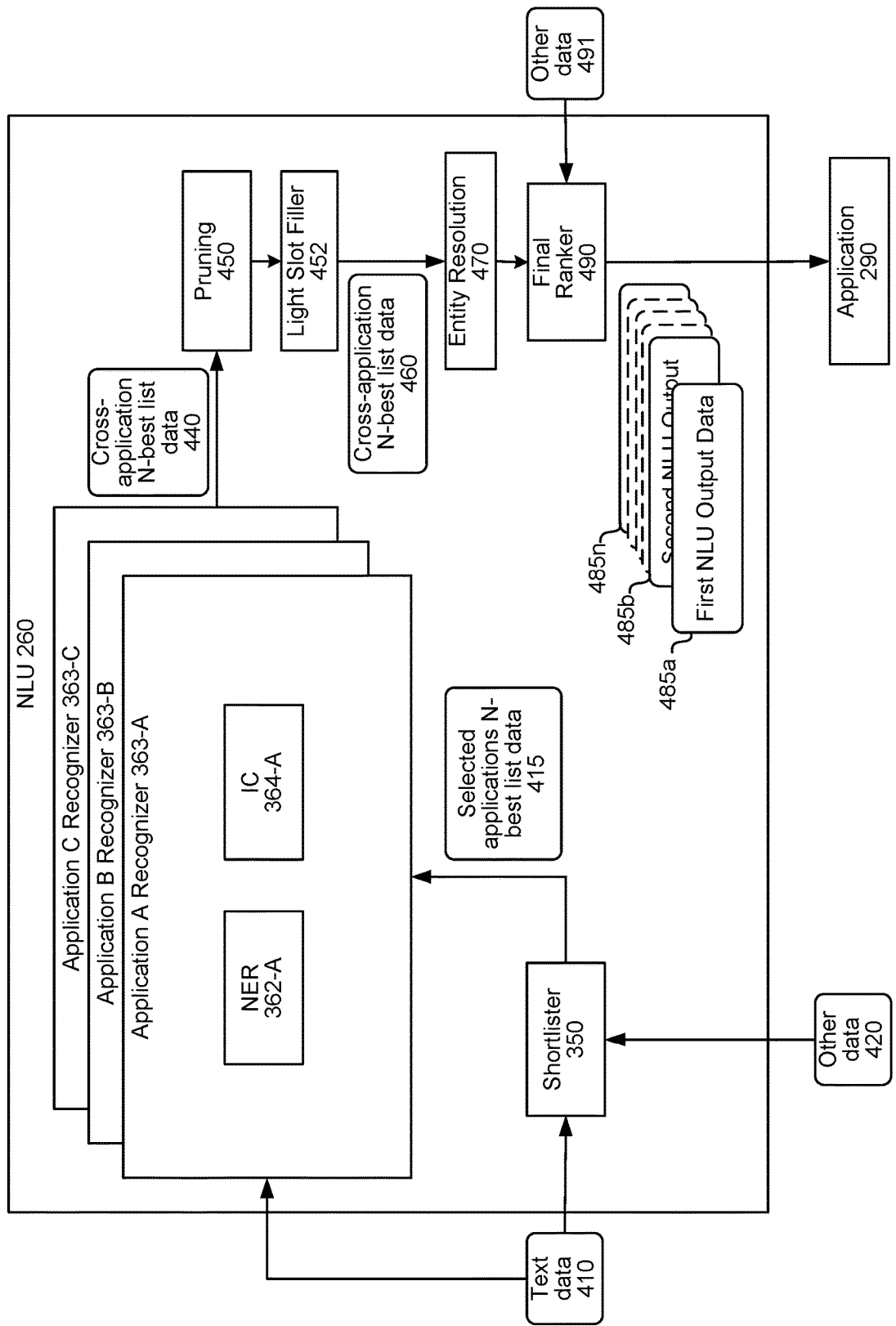
FIG. 4 is a conceptual diagram of how natural language processing is performed according to embodiments of the present disclosure.

The shortlister component 350 may receive text data 410 output from the ASR component 250 (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 350 to operate on the text. For example, an embedding of the text data 410 may be a vector representation of the text data.

The shortlister component 350 may make binary determinations (e.g., yes or no) regarding which application(s) 290 relate to the text data 410. The shortlister component 350 may make such determinations using the one or more trained models described herein above. If the shortlister component 350 implements a single trained model for each application 290, the shortlister component 350 may simply run the models that are associated with enabled applications as indicated in a profile (e.g., profile 502) associated with the device 110 and/or user that originated the command.

The shortlister component 350 may generate N-best list data 415 representing applications that may execute with respect to the command represented in the text data 410. The size of the N-best list represented in the N-best list data 415 is configurable. In an example, the N-best list data 415 may indicate every application of the system as well as contain an indication, for each application, regarding whether the application is likely capable to execute the command represented in the text data 410. In another example, instead of indicating every application of the system, the N-best list data 415 may only indicate all of the applications that are likely to be able to execute the command represented in the text data 410. In yet another example, the shortlister component 350 may implement thresholding such that the N-best list data 415 may indicate no more than a maximum number of applications that may execute the command represented in the text data 410. In an example, the threshold number of applications that may be represented in the N-best list data 415 is ten (10). In another example, the applications included in the N-best list data 415 may be limited by a threshold a score, where only applications indicating a likelihood to handle the command is above a certain score (as determined by processing the text data 410 by the shortlister component 350 relative to such applications).

The text data 410 may include text corresponding to more than one hypothesis determined by the ASR component 250. When this occurs, the shortlister component 350 may output a different N-best list (represented in the N-best list data 415) for each hypothesis. Alternatively, the shortlister component 350 may output a single N-best list representing the applications that are related to the multiple hypotheses represented in the text data 410.

As indicated above, the shortlister component 350 may implement thresholding such that an N-best list output therefrom may include no more than a threshold number of entries. If the text data 410 includes more than one hypothesis, the N-best list output by the shortlister component 350 may include no more than a threshold number of entries irrespective of the number of hypotheses output by the ASR component 250. Alternatively or in addition, the N-best list output by the shortlister component 350 may include no more than a threshold number of entries for each hypothesis (e.g., no more than five (5) entries for a first hypothesis, no more than five (5) entries for a second hypothesis, etc.).

In addition to making a binary determination regarding whether an application potentially relates to the text data 410, the shortlister component 350 may additionally generate confidence scores representing likelihoods that applications relate to the text data 410. If the shortlister component 350 implements a different trained model for each application 290, the shortlister component 350 may generate a different confidence score for each individual application trained model that is run. If the shortlister component 350 runs the models of every application 290 when text data 410 is received, the shortlister component 350 may generate a different confidence score for each application 290 of the system. If the shortlister component 350 runs the models of only the applications 290 that are indicated as enabled in a profile associated with the device 110 and/or user that originated the command, the shortlister component 350 may only generate a different confidence score for each enabled application. If the shortlister component 350 implements a single trained model with application specifically trained portions, the shortlister component 350 generate a different confidence score for each application who's specifically trained portion is run. The shortlister component 350 may perform matrix vector modification to obtain confidence scores for all applications 290 of the system in a single instance of processing of the text data 410.

N-best list data 415 including confidence scores that may be output by the shortlister component 350 may be represented as:
  Search application, 0.67
  Recipe application, 0.62
  Information application, 0.57
  Event application, 0.42
As indicated, the confidence scores output by the shortlister component 350 may be numeric values. The confidence scores output by the shortlister component 350 may alternatively be binned values (e.g., high, medium, low).

The N-best list may only include entries for applications having a confidence score satisfying (e.g., equaling or exceeding) a minimum threshold confidence score. Alternatively, the shortlister component 350 may include entries for all enabled applications even if one or more of the enabled applications are associated with confidence scores that do not satisfy the minimum threshold confidence score.

The shortlister component 350 may consider other data 420 when determining which applications may execute the command represented in the text data 410 as well as respective confidence scores. The other data 420 may include usage history data associated with the device 110 and/or user that originated the command. For example, a confidence score of an application may be increased if commands originated by the device 110 and/or user routinely invoke the application. Conversely, a confidence score of an application may be decreased if commands originated by the device 110 and/or user rarely invoke the application. Thus, the other data 420 may include an indicator of the user associated with the incoming text data 410, for example as determined by the user recognition component 295.

The other data 420 may be character embedded prior to being input to the shortlister component 350. The other data 420 may alternatively be embedded using other techniques known in the art prior to being input to the shortlister component 350.

The other data 420 may also include data indicating the applications that are enabled with respect to the device 110 and/or user that originated the command. The shortlister component 350 may use such data to determine which application specific trained models to run. That is, the shortlister component 350 may determine to only run the trained models associated with enabled applications. The shortlister component 350 may alternatively use such data to alter confidence scores of applications.

As an example, considering two applications, one enabled and another unenabled, the shortlister component 350 may run a first model specific to the unenabled application as well as a second model specific to the enabled application. Alternatively, the shortlister component 350 may run a model configured to determine a score for each application. The shortlister component 350 may determine a confidence score of 0.60 for each of the unenabled application and the enabled application in the first instance. The shortlister component 350 may then alter those confidence scores based on which application is enabled. For example, the shortlister component 350 may increase the confidence score associated with the enabled application while leaving the confidence score associated with the unenabled application the same. Alternatively, the shortlister component 350 may leave the confidence score associated with the enabled application the same while decreasing the confidence score associated with the unenabled application. Moreover, the shortlister component 350 may increase the confidence score associated with the enabled application as well as decrease the confidence score associated with the unenabled application.

A user may provide the system with indications of which skills are enabled (e.g., authorized to execute using data associated with the user). Such indications may be stored in the user profile storage 270. When the shortlister component 350 receives the text data 410, the shorlister component 350 may determine whether profile data associated with the user and/or device that originated the command includes an indication of enabled skills.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which application specific trained models to run. For example, if the device 110 corresponds to a displayless type device, the shortlister component 350 may determine not to run trained models specific to applications that output video data. The shortlister component 350 may alternatively use such data to alter confidence scores of applications.

As an example, considering two applications, one that outputs audio data and another that outputs video data, the shortlister component 350 may run a first model specific to the application that generates audio data as well as a second model specific to the application that generates video data. Alternatively the shortlister component 350 may run a model configured to determine a score for each application. The shortlister component 350 may determine a confidence score of 0.60 for each of the applications in the first instance. The shortlister component 350 may then alter the original confidence scores based on the type of the device 110 that originated the command corresponding to the text data 410. For example, if the device 110 is a displayless device, the shortlister component 350 may increase the confidence score associated with the application that generates audio data while leaving the confidence score associated with the application that generates video data the same. Alternatively, if the device 110 is a displayless device, the shortlister component 350 may leave the confidence score associated with the application that generates audio data the same while decreasing the confidence score associated with the application that generates video data. Moreover, if the device 110 is a displayless device, the shortlister component 350 may increase the confidence score associated with the application that generates audio data as well as decrease the confidence score associated with the application that generates video data.

The type of device information represented in the other data 420 may represent output capabilities of the device to be used to output content to the user, which may not necessarily be the command originating device. For example, a user may input a spoken command corresponding to "play Game of Thrones" to a device not including a display. The system may determine a smart TV or other display device for outputting Game of Thrones. Thus, the other data 420 may represent the smart TV of other display device, and not the displayless device that captured the spoken command.

The other data 420 may also include data indicating the command originating device's speed, location, or other mobility information. For example, the device may correspond to a vehicle including a display. If the vehicle is moving, the shortlister component 350 may decrease the confidence score associated with an application that generate video data as it may be undesirable to output video content to a user while the user is driving. The vehicle may output data to the server(s) indicating when the device is moving.

The other data 420 may also include data indicating a currently invoked application. For example, a user may speak a first (e.g., a previous) command causing the system to invoke an music application to output music to the user. As the system is outputting music to the user, the system may receive a second (e.g., the current) command. The shortlister component 350 may use such data to alter confidence scores of applications. For example, the shortlister component 350 may run a first model specific to a first application as well as a second model specific to a second application. Alternatively, the shortlister component 350 may run a model configured to determine a score for each application. The shortlister component 350 may also determine a confidence score of 0.60 for each of the applications in the first instance. The shortlister component 350 may then alter the original confidence scores based on the first application being invoked to cause the system to output content while the current command was received. Based on the first application being invoked, the shortlister component 350 may (i) increase the confidence score associated with the first application while leaving the confidence score associated with the second application the same, (ii) leave the confidence score associated with the first application the same while decreasing the confidence score associated with the second application, or (iii) increase the confidence score associated with the first application as well as decrease the confidence score associated with the second application.

The thresholding implemented with respect to the N-best list data 415 generated by the shortlister component 350 as well as the different types of other data 420 considered by the shortlister component 350 are configurable. For example, the shortlister component 350 may update confidence scores as more other data 420 is considered. For further example, the N-best list data 415 may exclude relevant applications if thresholding is implemented. Thus, for example, the shortlister component 350 may include an indication of an application in the N-best list 415 unless the shortlister component 350 is one hundred percent (100%) confident that the application may not execute the command represented in the text data 410 (e.g., the shortlister component 350 determines a confidence score of zero (0) for the application).

The shortlister component 350 may send the text data 410 to recognizers 363 associated with applications 290. Alternatively, the shortlister 350 may send the N-best list data 415 or some other indicator of the selected subset of application(s) to another component (such as the orchestrator component 230) which may in turn send the text data 410 to the recognizers 363 corresponding to the application(s) included in the N-best list data 415 or otherwise indicated in the indicator. If the shortlister component 350 generates an N-best list representing applications 290 without any associated confidence scores, the shortlister component 350/orchestrator component 230 may send the text data 410 to recognizers 363 associated with applications 290 that the shortlister component 350 determines may execute the command. If the shortlister component 350 generates an N-best list representing applications 290 with associated confidence scores, the shortlister component 350/orchestrator component 230 may send the text data 410 to recognizers 363 associated with applications 290 associated with confidence scores satisfying (e.g., meeting or exceeding) a threshold minimum confidence score.

A recognizer 363 may output tagged text data generated by an NER component 362 and an IC component 364 operated by the recognizer 363, as described herein above. The NLU component 260 may compile the output tagged text data of the recognizers 363 into a single cross-application N-best list, generate cross-application N-best list data 440 corresponding thereto, and may send the cross-application N-best list data 440 to a pruning component 450. Each entry of tagged text represented in the cross-application N-best list data 440 may be associated with a respective score indicating a likelihood that the tagged text corresponds to the application 290 associated with the recognizer 363 from which the tagged text was output. For example, the cross-application N-best list data 440 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the tagged text represented in the cross-application N-best list data 440 according to their respective scores. The pruning component 450 may then perform score thresholding with respect to the cross-application N-best list data 440. For example, the pruning component 450 may select tagged text represented in the cross-application N-best list data 440 associated with a score satisfying (e.g., meeting and/or exceeding) a threshold score. The pruning component 450 may also or alternatively perform number of tagged text entry thresholding. For example, the pruning component 450 may select the top scoring tagged text entries(s). The pruning component 450 may generate cross-application N-best list data 460 including the selected tagged text entries. The purpose of the pruning component 450 is to create a reduced list of tagged text entries so that downstream, more resource intensive, processes may only operate on the tagged text entries that most likely correspond to the command input to the system.

The NLU component 260 may also include a light slot filler component 452. The light slot filler component 452 can take text from slots represented in the tagged text entries output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-application N-best list data 460.

The NLU component 260 sends the cross-application N-best list data 460 to an entity resolution component 470. The entity resolution component 470 can apply rules or other instructions to standardize labels or tokens from previous stages into an intent/slot representation. The precise transformation may depend on the application. For example, for a travel application, the entity resolution component 470 may transform text corresponding to "Boston airport" to the standard BOS three-letter code referring to the airport. The entity resolution component 470 can refer to a knowledge base that is used to specifically identify the precise entity referred to in each slot of each tagged text entry represented in the cross-application N-best list data 460. Specific intent/slot combinations may also be tied to a particular source, which may then be used to resolve the text. In the example "play songs by the stones," the entity resolution component 470 may reference a personal music catalog, Amazon Music account, a user profile 502 (described herein), or the like. The entity resolution component 470 may output data, including an altered N-best list that is based on the cross-application N-best list represented in the cross-application N-best list data 460, that includes more detailed information (e.g., entity IDs) about the specific entities mentioned in the slots and/or more detailed slot data that can eventually be used by an application 290 incorporated into the server(s) 120 components or incorporated into an application server(s) 125. The NLU component 260 may include multiple entity resolution components 470 and each entity resolution component 470 may be specific to one or more applications.

The entity resolution component 470 may not be successful in resolving every entity and filling every slot represented in the N-best list represented in the cross-application N-best list data 460. This may result in the entity resolution component 470 outputting incomplete results. The NLU component 260 may include a final ranker component 490. The final ranker component 490 may assign a particular confidence score to each tagged text entry input therein. The confidence score of a particular tagged text entry may be affected by whether the tagged text entry has unfilled slots. For example, if a tagged text entry associated with a first application includes slots that are all filled/resolved, that tagged text entry may be assigned a higher confidence score than another tagged text entry including at least some slots that are unfilled/unresolved by the entity resolution component 470.

The final ranker component 490 may apply re-scoring, biasing, or other techniques to obtain the most preferred tagged and resolved text entry. To do so, the final ranker component 490 may consider not only the data output by the entity resolution component 470, but may also consider other data 491. The other data 491 may include a variety of information. For example, the other data 491 may include application rating or popularity data. For example, if one application has a high rating, the final ranker component 490 may increase the score of a tagged text entry output by a recognizer 363 associated with that application. The other data 491 may also include information about applications that have been enabled by the user that input the command to the system. For example, the final ranker component 490 may assign higher scores to tagged text entries output by recognizers 363 associated with enabled applications than tagged text entries output by recognizers 363 associated with non-enabled applications. The other data 491 may also include data indicating user usage history, such as if the user that input the command to the system regularly uses a particular application or does so at particular times of day. The other data 491 may additionally include data indicating date, time, location, weather, type of device 110, user ID, context, as well as other information. For example, the final ranker component 490 may consider when any particular application is currently active (e.g., music being played, a game being played, etc.).

Following final ranking, the NLU component 260 may output NLU output data 485. The NLU component 260 may send the NLU output data 485 to the orchestrator component 230, which sends the NLU output data 485 to an appropriate application 290 (e.g., one associated with the tagged text entry associated with the highest final ranked confidence score represented in the NLU output data 485).

The application 290 provides the server(s) 120 with output data responsive to the NLU output data 485 received thereby. If the output data is text data that needs to be converted to audio data to be output, the orchestrator component 230 sends the output text data to the text-to-speech component 280. The text-to-speech component 280 then outputs output audio data that is sent to a device (e.g., the device 110a) for output to a user. If the output data is text data that should be displayed, the orchestrator component 230 may cause the output text data to be sent to a device (e.g., the device 110b). If the output data is audio data that should be played, the orchestrator component 230 may cause the output audio data to be sent to a device (e.g., the device 110a). If the output data is audio data that needs to be converted to text data to be displayed, the orchestrator component sends the output audio data to the ASR component 250. The ASR component 250 then outputs output text data that is sent to a device (e.g., the device 110b) for display to a user.

Figure 5:
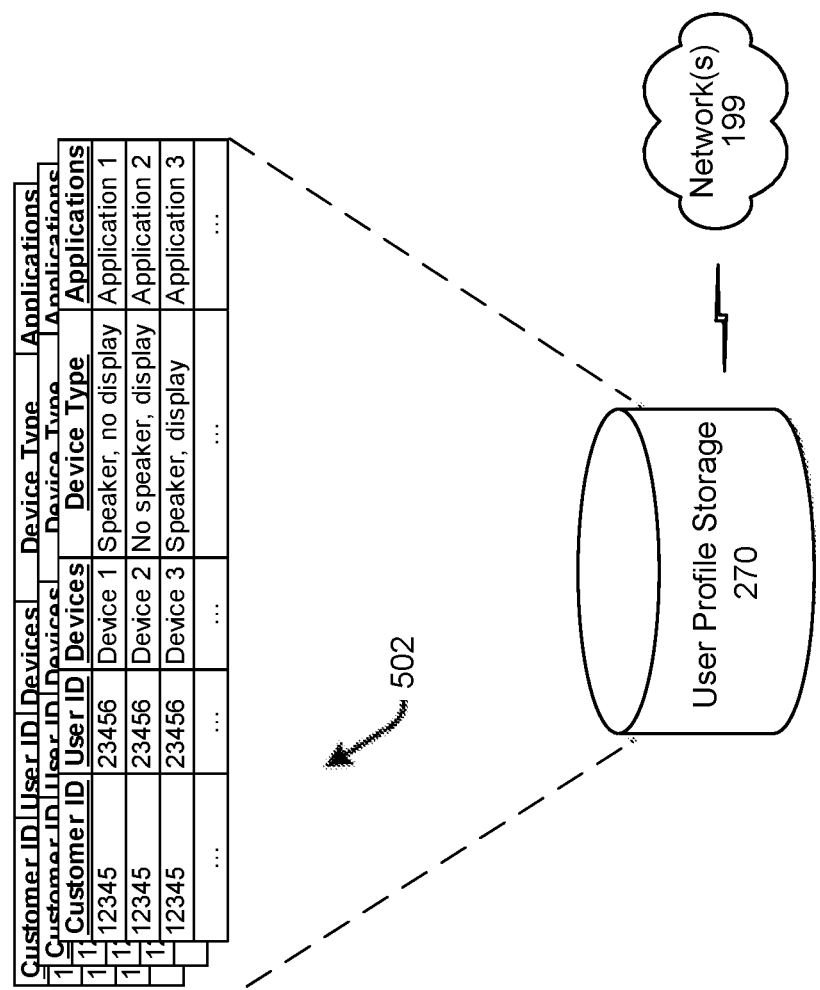
FIG. 5 illustrates data stored and associated with user profiles according to embodiments of the present disclosure.

FIG. 5 illustrates the user profile storage 270 that includes data regarding customer profiles as well as individual user profiles 502. Each user profile 502 may include information the types of devices and enabled applications. Each user profile 502 may additionally include other data not explicitly illustrated.

Figure 6:
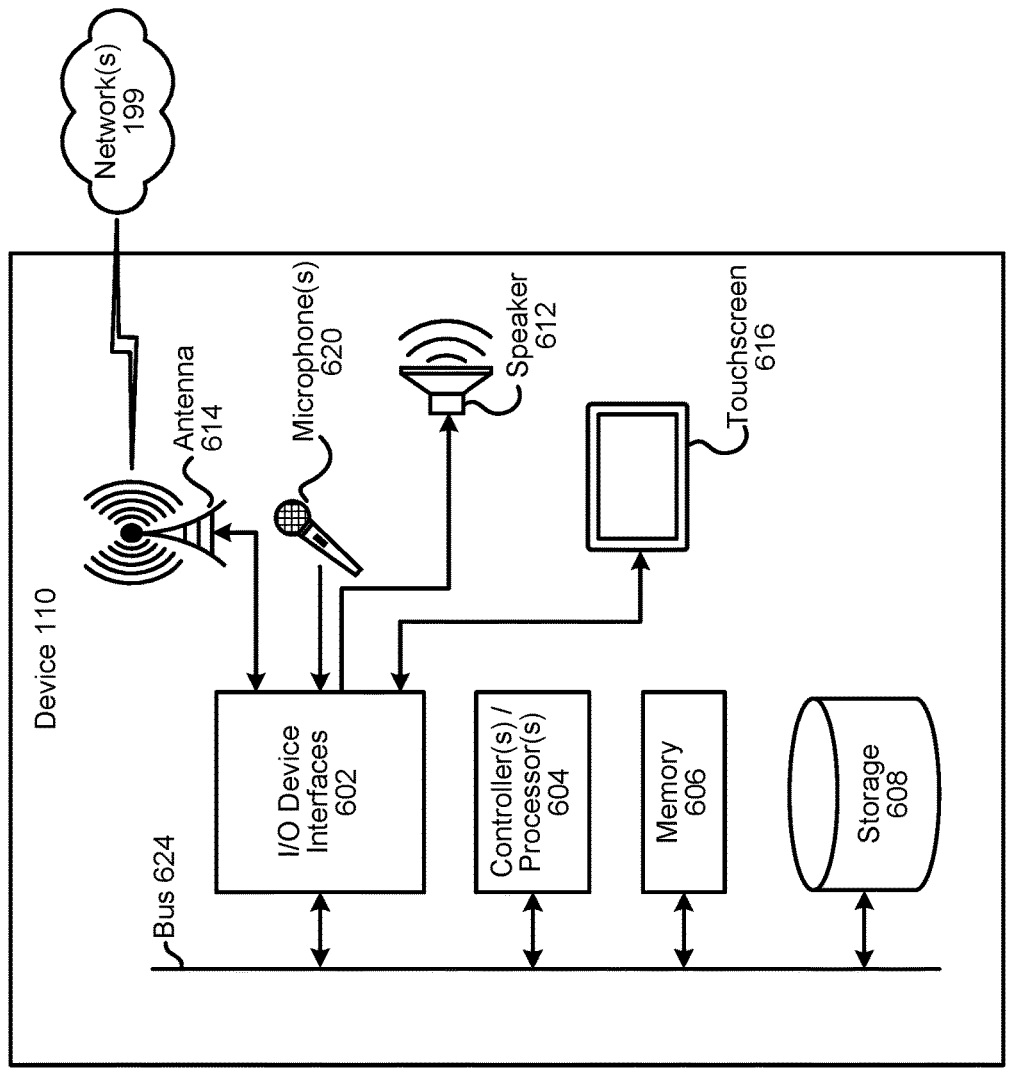
FIG. 6 is a block diagram conceptually illustrating example components of a device according to embodiments of the present disclosure.
Figure 7:
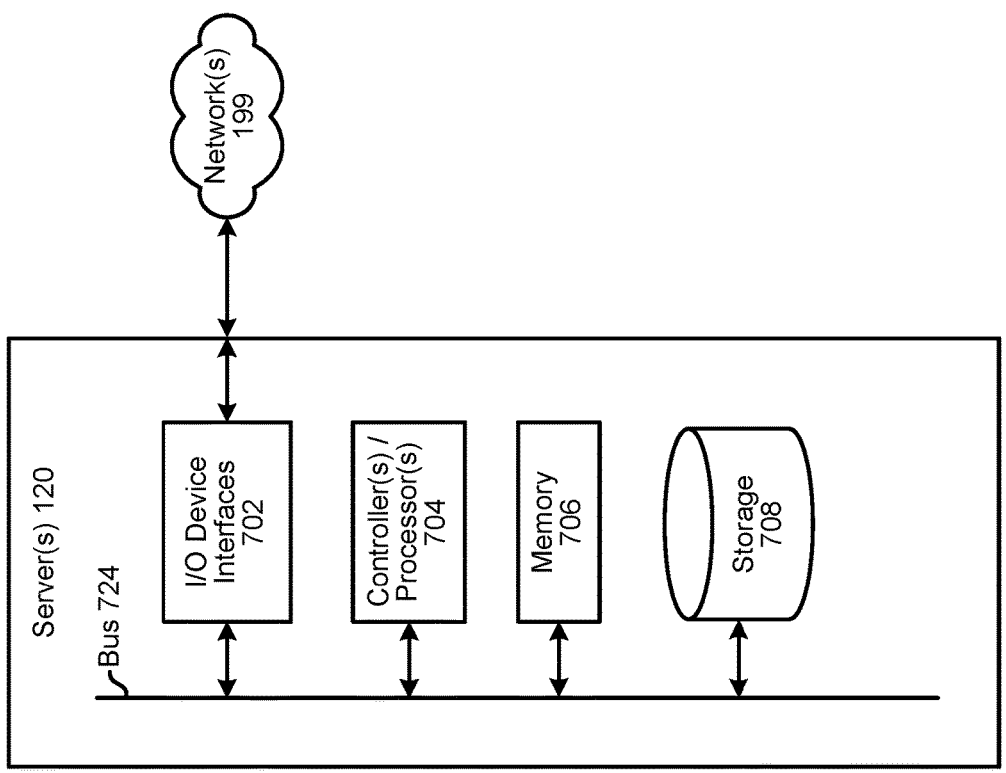
FIG. 7 is a block diagram conceptually illustrating example components of a server according to embodiments of the present disclosure.

FIG. 6 is a block diagram conceptually illustrating a user device 110 that may be used with the system. FIG. 7 is a block diagram conceptually illustrating example components of a remote device, such as the server(s) 120, which may assist with ASR processing, NLU processing, or command processing. Multiple servers 120 may be included in the system, such as one server 120 for performing ASR processing, one server 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120) may also include a data storage component (608/708) for storing data and controller/processor-executable instructions. Each data storage component (608/708) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces (602/702), as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (602/702) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (602/702), processor(s) (604/704), memory (606/706), and/or storage (608/708) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 8, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart TV 110g may be connected to the network(s) 199 through a wireless service provider, over a WiFi or cellular network connection, or the like. Other devices are included as network-connected support devices, such as the server(s) 120, application server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system comprising:
   at least one processor; and
   at least one memory including instructions that, when executed by the at least one processor, cause the system to:
   receive input text data associated with a source device;
   determine a first confidence score representing a first likelihood that a first application is configured to execute a command represented in the input text data;
   determine a second confidence score representing a second likelihood that a second application is configured to execute the command;
   determine a third confidence score representing a third likelihood that a third application is configured to execute the command;
   perform natural language understanding (NLU) processing on the input text data using at least one first NLU component associated with the first application to generate first NLU data corresponding to at least one first NLU score;
   perform NLU processing on the input text data using at least one second NLU component associated with the second application to generate second NLU data corresponding to at least one second NLU score;
   select the first NLU data based at least in part on the at least one first NLU score and the at least one second NLU score; and
   cause, based at least in part on the first NLU data, the first application to execute the command.

2. The system of claim 1, wherein the at least one memory further includes instructions that, when executed by the at least one processor, further cause the system to:
   determine the first confidence score by implementing a first trained model on the input text data, the first trained model being trained specific to the first application; and
   determine the second confidence score by implementing a second trained model on the input text data, the second trained model being trained specific to the second application.

3. The system of claim 1, wherein the at least one memory further includes instructions that, when executed by the at least one processor, further cause the system to:
   determine the first confidence score by implementing a first portion of a trained model on the input text data, the first portion being trained specific to the first application; and
   determine the second confidence score by implementing a second portion of the trained model on the input text data, the second portion being trained specific to the second application.

4. The system of claim 1, wherein the at least one memory further includes instructions that, when executed by the at least one processor, further cause the system to:
   determine profile data associated with the source device;
   determine at least a portion of the profile data indicates the first application is enabled; and
   determine, based at least in part on the first application being enabled, the first confidence score.

5. The system of claim 1, wherein the at least one memory further includes instructions that, when executed by the at least one processor, further cause the system to:
   determine profile data associated with the source device;
   determine at least a portion of the profile data indicates the first application is enabled;
   determine an adjusted first confidence score based at least in part on the first application being enabled and the first confidence score; and
   perform, based at least in part on the adjusted first confidence score, NLU processing using the at least one first NLU component.

6. The system of claim 1, wherein the second application generates output video data, and wherein the at least one memory further includes instructions that, when executed by the at least one processor, further cause the system to:
   determine profile data associated with the source device;
   determine at least a portion of the profile data indicates the source device is displayless; and
   determine an adjusted first confidence score based at least in part on the at least a portion of the profile data indicating the source device is displayless and based at least in part on the first confidence score.

7. The system of claim 1, wherein the second application generates output video data, and wherein the at least one memory further includes instructions that, when executed by the at least one processor, further cause the system to:
  determine the source device is in motion; and
  determine an adjusted first confidence score based at least in part on the source device being in motion and the first confidence score.

8. The system of claim 1, wherein the at least one memory further includes instructions that, when executed by the at least one processor, further cause the system to:
  determine the source device is outputting content associated with the first application when the input text data is received; and
  determine an adjusted first confidence score based at least in part on the content being associated with the first application and the first confidence score, the adjusted first confidence score being greater than the first confidence score.

9. The system of claim 1, wherein the at least one memory further includes instructions that, when executed by the at least one processor, further cause the system to:
  determine the first confidence score satisfies a threshold confidence score;
  determine the second confidence score satisfies the threshold confidence score;
  determine the third confidence score fails to satisfy the threshold confidence score;
  based at least in part on determining the first confidence score satisfies the threshold confidence score; perform NLU processing using the at least one first NLU component;
  based at least in part on determining the second confidence score satisfies the threshold confidence score, perform NLU processing using the at least one second NLU component; and
  based at least in part on determining the third confidence score fails to satisfy the threshold confidence score, do not perform NLU processing on the input text data using at least one third NLU component associated with the third application.

10. The system of claim 1, wherein the at least one memory further includes instructions that, when executed by the at least one processor, further cause the system to:
  determine usage history data associated with the source device;
  determine at least a portion of the usage history data corresponds to the first application;
  determine an adjusted first confidence score based at least in part on the at least a portion of the usage history data corresponding to the first application; and
  perform, based at least in part on the adjusted first confidence score, NLU processing using the at least one first NLU component.

11. A computer-implemented method comprising:
  receiving input text data associated with a source device;
  determining a first confidence score representing a first likelihood that a first application is configured to execute a command represented in the input text data;
  determining a second confidence score representing a second likelihood that a second application is configured to execute the command;
  determining a third confidence score representing a third likelihood that a third application is configured to execute the command;
  performing natural language understanding (NLU) processing on the input text data using at least one first NLU component associated with the first application to generate first NLU data corresponding to at least one first NLU score;
  performing NLU processing on the input text data using at least one second NLU component associated with the second application to generate second NLU data corresponding to at least one second NLU score;
  selecting the first NLU data based at least in part on the at least one first NLU score and the at least one second NLU score; and
  causing, based at least in part on the first NLU data, the first application to execute the command.

12. The computer-implemented method of claim 11, further comprising
  determining the first confidence score by implementing a first trained model on the input text data, the first trained model being trained specific to the first application; and
  determining the second confidence score by implementing a second trained model on the input text data, the second trained model being trained specific to the second application.

13. The computer-implemented method of claim 11, further comprising:
  determining the first confidence score by implementing a first portion of a trained model on the input text data, the first portion being trained specific to the first application; and
  determining the second confidence score by implementing a second portion of the trained model on the input text data, the second portion being trained specific to the second application.

14. The computer-implemented method of claim 11, further comprising:
  determining profile data associated with the source device;
  determining at least a portion of the profile data indicates the first application is enabled; and
  determining, based at least in part on the first application being enabled, the first confidence score.

15. The computer-implemented method of claim 11, further comprising:
  determining profile data associated with the source device;
  determining at least a portion of the profile data indicates the first application is enabled;
  determining an adjusted first confidence score based at least in part on the first application being enabled and the first confidence score; and
  performing, based at least in part on the adjusted first confidence score, NLU processing using the at least one first NLU component.

16. The computer-implemented method of claim 11, wherein the second application generates output video data, and wherein the computer-implemented method further comprises:
  determining profile data associated with the source device;
  determining at least a portion of the profile data indicates the source device is displayless; and
  determining an adjusted first confidence score based at least in part on the at least a portion of the profile data indicating the source device is displayless and based at least in part on the first confidence score.

17. The computer-implemented method of claim 11, wherein the second application generates output video data, and wherein the computer-implemented method further comprises:
- determining the source device is in motion; and
- determining an adjusted first confidence score based at least in part on the source device being in motion and the first confidence score.

18. The computer-implemented method of claim 11, further comprising:
- determining the source device is outputting content associated with the first application when the input text data is received; and
- determining an adjusted first confidence score based at least in part on the content being associated with the first application and the first confidence score, the adjusted first confidence score being greater than the first confidence score.

19. The computer-implemented method of claim 11, further comprising:
- determining the first confidence score satisfies a threshold confidence score;
- determining the second confidence score satisfies the threshold confidence score;
- determining the third confidence score fails to satisfy the threshold confidence score;
- based at least in part on determining the first confidence score satisfies the threshold confidence score; performing NLU processing using the at least one first NLU component;
- based at least in part on determining the second confidence score satisfies the threshold confidence score, performing NLU processing using the at least one second NLU component; and
- based at least in part on determining the third confidence score fails to satisfy the threshold confidence score, not performing NLU processing on the input text data using at least one third NLU component associated with the third application.

20. The computer-implemented method of claim 11, further comprising:
- determining usage history data associated with the source device;
- determining at least a portion of the usage history data corresponds to the first application;
- determining an adjusted first confidence score based at least in part on the at least a portion of the usage history data corresponding to the first application; and
- performing, based at least in part on the adjusted first confidence score, NLU processing using the at least one first NLU component.

* * * * *